United States Patent
Sone et al.

(10) Patent No.: US 8,979,262 B2
(45) Date of Patent: *Mar. 17, 2015

(54) SEMI-FINISHED BLANK FOR VARIFOCAL LENS, VARIFOCAL LENS, AND VARIFOCAL EYEGLASSES

(71) Applicant: Mitsui Chemicals, Inc., Tokyo (JP)

(72) Inventors: Kouji Sone, Ehime (JP); Satoko Machida, Ehime (JP); Shunsuke Nishihara, Ehime (JP); Akihiro Muramatsu, Ehime (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/015,265

(22) Filed: Aug. 30, 2013

(65) Prior Publication Data
US 2014/0002791 A1 Jan. 2, 2014

Related U.S. Application Data

(63) Continuation of application No. 13/302,355, filed on Nov. 22, 2011, now abandoned.

(30) Foreign Application Priority Data

Dec. 21, 2010 (JP) ................................. 2010-284897

(51) Int. Cl.
*G02C 7/04* (2006.01)
*G02C 7/02* (2006.01)
(Continued)

(52) U.S. Cl.
CPC .............. *G02C 7/083* (2013.01); *G02B 3/0081* (2013.01); *G02B 3/08* (2013.01); *G02B 15/00* (2013.01); *G02C 2202/20* (2013.01)
USPC ............................... 351/159.39; 351/159.03

(58) Field of Classification Search
CPC ............ G02C 7/02; G02C 7/022; G02C 7/04; G02C 7/049; G02C 7/08; G02C 7/081; G02C 7/083

USPC ............. 351/159.03, 159.39, 159.7; 359/642, 359/676, 796; 349/13
See application file for complete search history.

(56) References Cited

U.S. PATENT DOCUMENTS

6,795,157 B2  9/2004  Okuwaki et al.
8,517,534 B2 *  8/2013  Sone et al. ................. 351/159.4
(Continued)

FOREIGN PATENT DOCUMENTS

EP  1 366 858 A1  12/2003
EP  2 431 790 A1  3/2012
(Continued)

OTHER PUBLICATIONS

International Search Report issued Dec. 20, 2011 corresponding International Application No. PCT/JP2011/005835.
(Continued)

*Primary Examiner* — Darryl J Collins
(74) *Attorney, Agent, or Firm* — Wenderoth, Lind & Ponack, L.L.P.

(57) ABSTRACT

A semi-finished blank for a varifocal lens, as well as a varifocal lens and varifocal eyeglasses, have power consumption reduced and avoid a decrease in commercial value. A first substrate has a first transparent conductive film that is produced on the front face of this first substrate. A second substrate that is opposite the first substrate has a second transparent conductive film that is produced on the back face of this second substrate. A varifocal portion is disposed between the front face of the first substrate and the back face of the second substrate. The first transparent conductive film is separated by laser into a first region that includes a region that is opposite the varifocal portion, and a region other than this first region.

6 Claims, 6 Drawing Sheets

(51) Int. Cl.
   *G02B 1/00*   (2006.01)
   *G02C 7/08*   (2006.01)
   *G02B 3/00*   (2006.01)
   *G02B 3/08*   (2006.01)
   *G02B 15/00*  (2006.01)

(56) References Cited

U.S. PATENT DOCUMENTS

| | | |
|---|---|---|
| 8,523,354 B2 | 9/2013 | Haddock et al. |
| 2004/0043710 A1 | 3/2004 | Miyazawa |
| 2007/0268417 A1* | 11/2007 | Kato et al. ............... 349/13 |
| 2009/0046349 A1 | 2/2009 | Haddock et al. |
| 2009/0256977 A1* | 10/2009 | Haddock et al. ........... 349/13 |
| 2010/0265456 A1 | 10/2010 | Matsui |
| 2012/0081659 A1 | 4/2012 | Matsui |
| 2014/0009700 A1 | 1/2014 | Haddock et al. |

FOREIGN PATENT DOCUMENTS

| | | |
|---|---|---|
| JP | 2002-263998 | 9/2002 |
| JP | 2004-518167 | 6/2004 |
| JP | 2005-519684 | 7/2005 |
| JP | 2011-516927 | 5/2011 |
| WO | 02/055261 | 7/2002 |
| WO | 2009/081542 | 7/2009 |
| WO | 2009/126946 | 10/2009 |

OTHER PUBLICATIONS

Office Action issued Feb. 12, 2013 in U.S. Appl. No. 13/514,737.

Extended European Search Report issued Oct. 23, 2013 in corresponding European Application No. 11852014.7.

* cited by examiner

SEMI-FINISHED BLANK FOR VARIFOCAL LENS, VARIFOCAL LENS, AND VARIFOCAL EYEGLASSES

BACKGROUND OF THE INVENTION

1. Field of the Invention

The present invention relates to a semi-finished blank for a varifocal lens, to a varifocal lens, and to varifocal eyeglasses, which are used as optical members with which the focal point is varied by application of voltage to a varifocal portion.

2. Description of the Related Art

A semi-finished blank for a varifocal liquid crystal lens is made up of a lower substrate whose front face has a convex bend, an upper substrate having a rear face with a concave bend that is joined opposite this front face, a varifocal portion that is disposed between the upper and lower substrates, and so forth. A thin film, such as a transparent conductive film, is formed on the front of the lower substrate and on the back face of the upper substrate. The refractive index of the varifocal portion can be changed by applying voltage to the liquid crystal material via the transparent conductive film, so this blank can be used as a lens for bifocal eyeglasses (Patent Literature 1).

CITATION LIST

Patent Literature

Patent Literature 1: Laid-Open US Patent 2009/256977

SUMMARY OF THE INVENTION

Problem to be Solved by the Invention

However, the following problems were encountered with the conventional constitution discussed above.

Specifically, with the constitution disclosed in the above-mentioned publication, even though the varifocal portion is only present in a partial region of the lens, the transparent conductive film is formed over the entire rear face of the upper substrate and the front face of the lower substrate. Accordingly, when voltage is applied to the varifocal portion, the voltage ends up being applied to the entire lens. If the power consumption of varifocal eyeglasses is high, frequent recharging is necessary, or a battery with a large capacity has to be used, both of which diminish the commercial value of the varifocal eyeglasses.

It is an object of the present invention to provide a semi-finished blank for a varifocal lens, a varifocal lens, and varifocal eyeglasses with which power consumption can be reduced and a decrease in commercial value can be prevented.

Means for Solving Problem

The present invention comprises a first substrate, a first transparent conductive film, a second substrate, a second transparent conductive film, a varifocal portion, a first region, and a second region. The first transparent conductive film is produced on the front face of the first substrate. The second substrate is opposite the first substrate. The second transparent conductive film is produced on the back face of the second substrate. The varifocal portion is disposed between the front face of the first substrate and the back face of the second substrate. The first region is opposite the varifocal portion in the first transparent conductive film. The second region is separated from the first region as a region other than the first region in the first transparent conductive film.

Also, with the present invention, the second region may be separated into a third region that is opposite the varifocal portion, and a fourth region other than the third region.

Also, the present invention preferably comprises a first internal electrode connected to the first transparent conductive film, and a second internal electrode connected to the second transparent conductive film, wherein the first region includes the region of the first transparent conductive film that is opposite the first internal electrode, and the second region includes the region of the second transparent conductive film that is opposite the second internal electrode.

Also, the present invention comprises a first substrate, a first transparent conductive film, a second substrate, a second transparent conductive film, a varifocal portion, a first region, a second region, a third region, a fourth region, a first applying region, and a second applying region. The first substrate has a liquid crystal support portion on its surface. The first transparent conductive film is produced on the front face of the first substrate. The second substrate is opposite the first substrate. The second transparent conductive film is produced on the back face of the second substrate. The varifocal portion is disposed between the front face of the liquid crystal support portion and the back face of the second substrate. The first region is opposite the varifocal portion in the first transparent conductive film. The second region is separated from the first region as a region other than the first region in the first transparent conductive film. The third region is opposite the varifocal portion in the second transparent conductive film. The fourth region is separated from the third region as a region other than the third region in the second transparent conductive film. The first applying region is formed in the first region covering the varifocal portion. The second applying region is formed in the second region covering the varifocal portion, and includes the region of the second transparent conductive film that is opposite the first applying region.

Also, the present invention preferably further comprises a first internal electrode connected to the first transparent conductive film, and a second internal electrode connected to the second transparent conductive film, wherein the first region includes the region of the first transparent conductive film that is opposite the first internal electrode, the third region includes the region of the second transparent conductive film that is opposite the second internal electrode, and a connecting region of the third region that connects the second applying region and the region of the second transparent conductive film that is opposite the second internal electrode is provided at a position that is offset from a position that is opposite a connecting region of the first region that connects the first applying region and the region of the first transparent conductive film that is opposite the first internal electrode.

The varifocal lens of the present invention comprises a first substrate, a first transparent conductive film, a second substrate, a second transparent conductive film, a varifocal portion, a first internal electrode, a second internal electrode, a first terminal, a second terminal, a first region, and a second region. The first transparent conductive film is produced on the front face of the first substrate. The second substrate is opposite the first substrate. The second transparent conductive film is produced on the back face of the second substrate. The varifocal portion is disposed between the front face of the first substrate and the back face of the second substrate. The first internal electrode is connected to the first transparent conductive film. The second internal electrode is connected to the second transparent conductive film. The first terminal and the second terminal are connected to the first internal electrode and the second internal electrode, respectively, and are provided on the side face of the varifocal lens. The first region is opposite the varifocal portion in the first transparent conductive film. The second region is separated from the first region as a region other than the first region in the first transparent conductive film.

Further, the varifocal lens of the present invention can be used in varifocal eyeglasses along with a specific circuit section.

Effects of the Invention

The semi-finished blank for a varifocal lens, the varifocal lens, and the varifocal eyeglasses of the present invention reduce power consumption and prevent a decrease in commercial value.

Specifically, since the transparent conductive films are separated so that voltage can be applied just to the required region, the presence of the transparent conductive films has almost no effect on the refractive index or transmissivity.

DETAILED DESCRIPTION OF THE INVENTION

Embodiment 1

Figure 1:
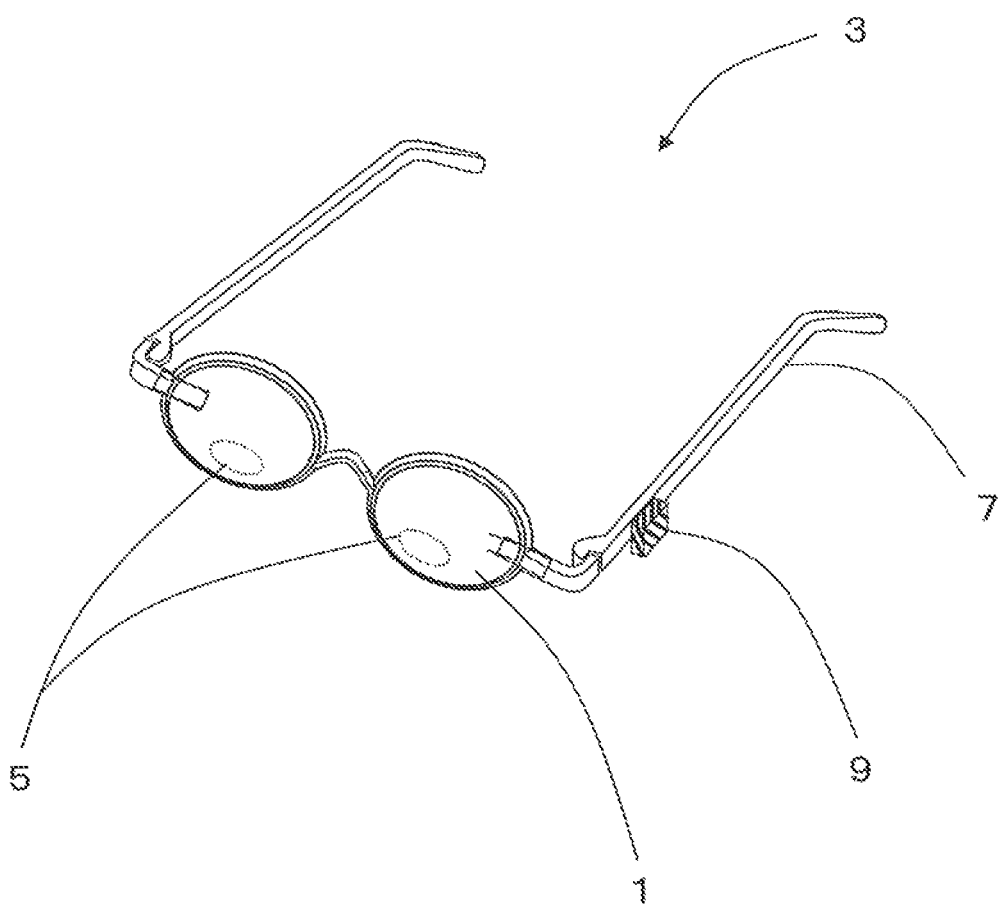
FIG. 1 is an overall configuration diagram of varifocal eyeglasses pertaining to Embodiment 1 of the present invention.

The semi-finished blank for a varifocal lens pertaining to an embodiment of the present invention will now be described in detail along with the drawings. FIG. 1 is a simplified configuration diagram of making varifocal eyeglasses 3 from a varifocal lens 1 obtained by subjecting the semi-finished blank for a varifocal lens of this embodiment to surfacing, edging, or another such specific process.

The varifocal lens 1 has a varifocal portion 5 in part of the lower region offset from the center of the lens.

An eyeglass frame 7 is provided with a circuit section 9 having a battery, sensor circuit, etc. (not shown). For example, a sensor circuit featuring an acceleration sensor has the function of outputting an on/off signal depending on the upper and lower angle of the head of the person wearing the varifocal eyeglasses 3, and controls voltage that is applied to the varifocal portion 5.

With this configuration of the varifocal eyeglasses 3, the application of voltage to the varifocal portion 5 is switched on the basis of a signal from the sensor circuit. Consequently, these can be made to function as bifocal eyeglasses by changing the apparent refractive index of the varifocal portion 5.

Next, the configuration will be described for a varifocal lens semi-finished blank 11, which is a stage prior to the machining of the varifocal lens 1 of the varifocal eyeglasses 3.

The varifocal lens semi-finished blank 11 comprises a first substrate 19, a second substrate 41, a cholesteric liquid crystal material 17 (constituting the varifocal portion 5), etc. The varifocal portion 5 is disposed between the convex curved face of the first substrate 19 and the concave curved face of the second substrate 41.

Figure 2A:
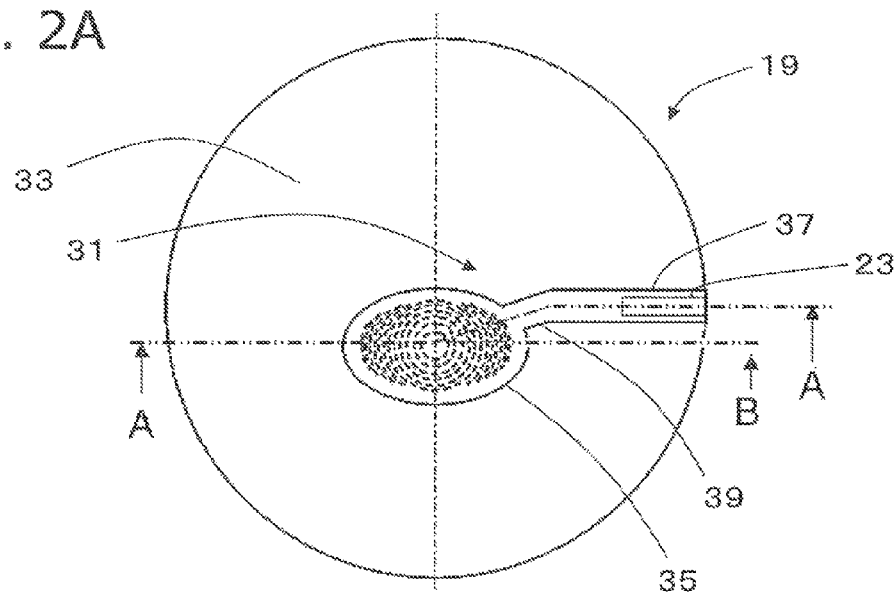
FIG. 2A is a front view of a lower substrate in the semi-finished blank for a varifocal lens pertaining to Embodiment 1 of the present invention.
Figure 2B:
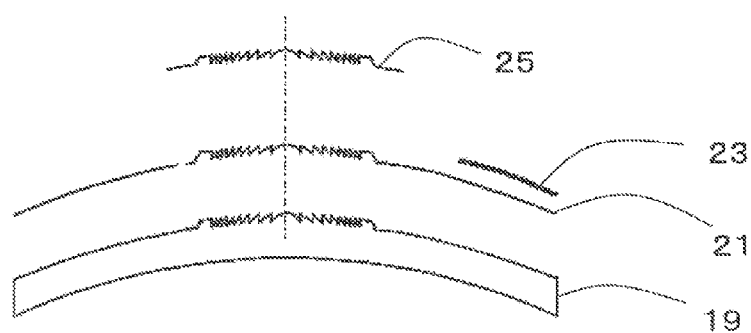
FIG. 2B is a cross section along the A-A line thereof.

FIG. 2A shows the first substrate 19 that constitutes the varifocal lens semi-finished blank 11. The first substrate 19 is made of plastic (such as thiourethane). A first transparent conductive film 21, a first internal electrode 23, a first insulating layer (not shown), and a first oriented film 25 are formed in that order, starting from the first substrate 19, on the first substrate 19 as shown in FIG. 2B.

Figure 2C:
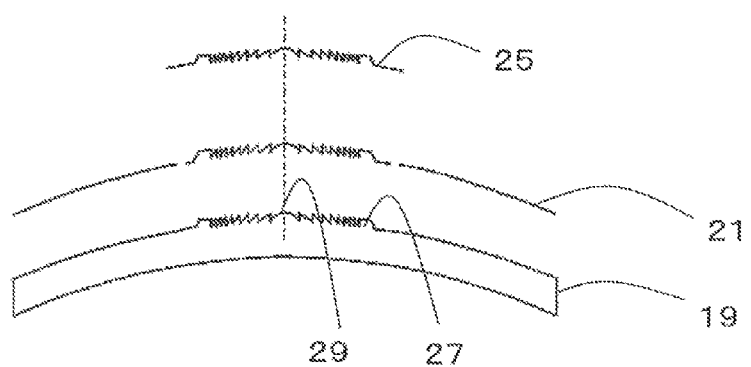
FIG. 2C is cross section along the A-B line thereof.

Also, as shown in FIG. 2C, a liquid crystal holder 27 is formed in part of the region on the convex curved face of the first substrate 19. A Fresnel lens 29 is formed on the top face of the liquid crystal holder 27. The Fresnel lens 29 is not formed over the entire upper surface of the liquid crystal holder 27, but rather is formed at a position to the inside, a specific distance away from the outer periphery of the top face. Consequently, in the manufacturing process, even if the cholesteric liquid crystal material 17 should be applied in an amount such that it bulges out from the Fresnel lens 29, there will be enough room for the material to stop on the upper surface of the liquid crystal holder 27.

The first transparent conductive film 21 is formed on the convex curved face, which is the front face of the first substrate 19. The first oriented film 25 is formed via the first transparent conductive film 21 on the region of the first transparent conductive film 21 that corresponds to the liquid crystal holder 27. The first internal electrode 23 is formed on the first transparent conductive film 21, from the outer peripheral part of the first substrate 19 part of the way toward the varifocal portion 5 (liquid crystal holder 27).

The cholesteric liquid crystal material 17 is applied over the front face of the first oriented film 25.

The first transparent conductive film 21 is separated by laser (not shown) scribing into a region 31 (first region) including a region 35 (first applying region) that is opposite the varifocal portion 5 and a region 37 that is opposite the first internal electrode 23, and all the rest of the region 33 (second region).

Specifically, the region 31 is made up of the region 35 of the first transparent conductive film 21, the region 37 (applying region of the first internal electrode 23), and a connecting region 39. The region 35 is the region of the first transparent conductive film 21 that covers the varifocal portion 5, or in other words, the region of the first transparent conductive film 21 that surrounds the region opposite the varifocal portion 5. The region 37 is the region of the first transparent conductive film 21 that is opposite the first internal electrode 23. The connecting region 39 is a region that connects the region 35 of the varifocal portion 5 with the region 37 of the first internal electrode 23.

Thus, the first transparent conductive film 21 is separated by laser scribing into the region 31 and the region 33 (everything else but the region 31). Consequently, the region 31 (the regions 35, 37, and 39) is not electrically connected to the region 33. As a result, voltage that is applied from the first internal electrode 23 is applied only to the varifocal portion 5, and this lowers the power consumption of the varifocal eyeglasses 3.

As shown in FIG. 2A, the region 35 of the varifocal portion 5 has a substantially elliptical shape that surrounds the outer periphery of the liquid crystal holder 27, and the region 37 of the first internal electrode 23 and the connecting region 39, which have substantially the same width, are connected at part of this outer periphery.

Figure 3A:
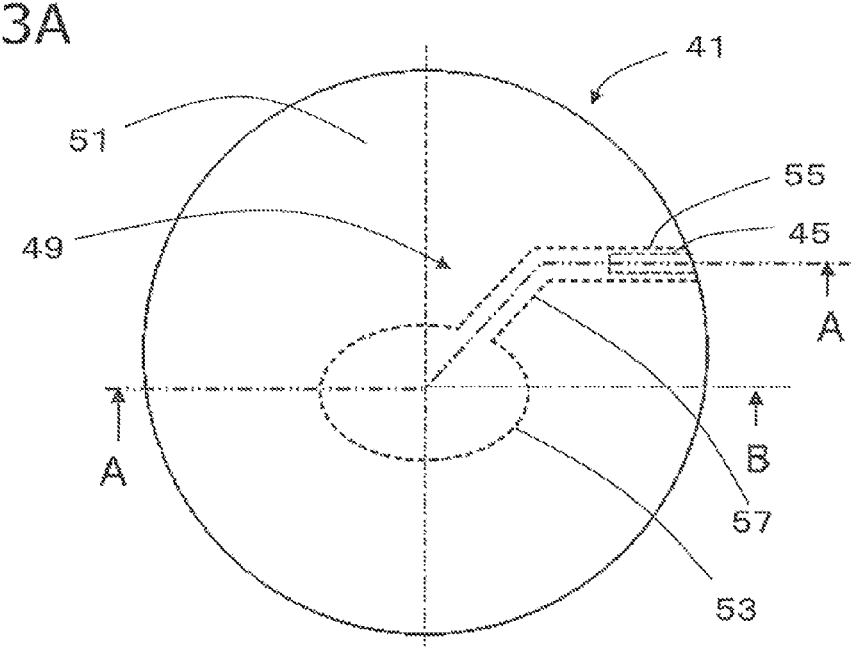
FIG. 3A is a front view of an upper substrate in the semi-finished blank for the varifocal lens pertaining to Embodiment 1 of the present invention.

Next, the second substrate 41 that is opposite the convex curved face of the first substrate 19 will be described through reference to FIGS. 3A to 3C.

Figure 3B:
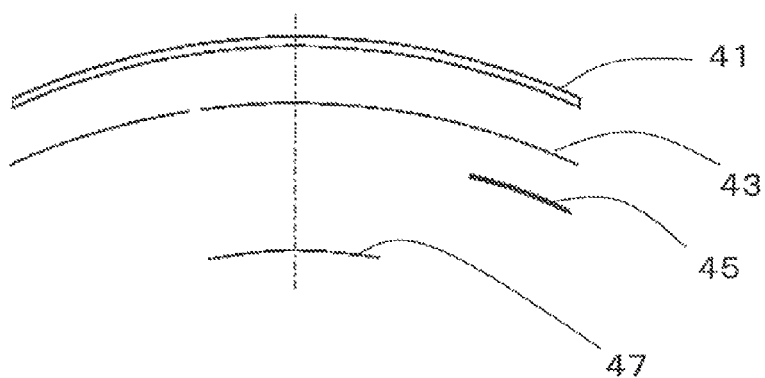
FIG. 3B is a cross section along the B-A line thereof.
Figure 3C:
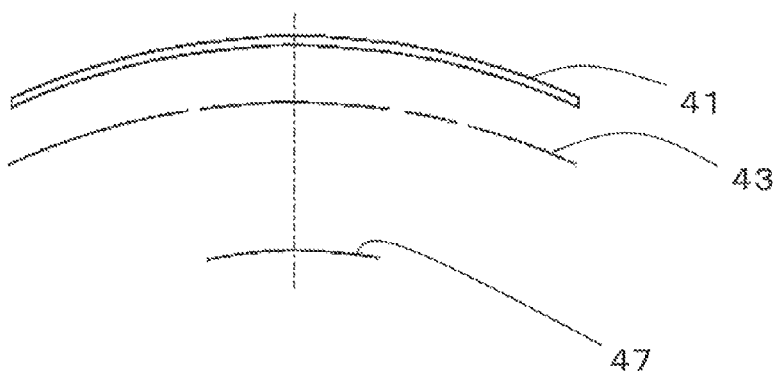
FIG. 3C is cross section along the B-B line thereof.

As shown in FIG. 3B, a second transparent conductive film 43, a second internal electrode 45, a second insulating layer (not shown), and a second oriented film 47 are formed in that order, starting from the second substrate 41 side, on the back side of the second substrate 41.

The second substrate 41 is made of plastic, as is the first substrate 19, but no Fresnel lens is formed.

The second transparent conductive film 43 is formed on the concave curved face (the back side) of the second substrate 41. The second oriented film 47 is formed in the region of the second transparent conductive film 43 that is opposite the varifocal portion 5. The second internal electrode 45 is formed on the second transparent conductive film 43 from the outer periphery of the second substrate 41 part of the way toward the varifocal portion 5.

As shown in FIG. 3A, the second transparent conductive film 43 is separated by laser scribing into a region 49 (first region) that includes a region opposite the varifocal portion 5 and a region opposite the second internal electrode 45, and a region 51 (second region) that is everything else but the region 49.

Specifically, the region 49 is made up of a region 53 (second applying region), a region 55, and a connecting region 57. The region 53 is the region of the second transparent conductive film 43 that covers the varifocal portion 5, or in other words, the region that surrounds the region of the second transparent conductive film 43 that is opposite the varifocal portion 5. The region 55 is the applying region of the second internal electrode 45 and is opposite the second internal electrode 45. The connecting region 57 is the region that connects between the region 53 of the varifocal portion 5 and the region 55 of the second internal electrode 45.

Thus, the second transparent conductive film 43 is separated by laser scribing into the region 49 and the region 51 (everything else but the region 49). Consequently, the region 49 (the regions 53, 55, and 57) is not electrically connected to the region 51.

As shown in FIG. 3A, the region 53 where voltage is applied to the varifocal portion 5 has a substantially elliptical shape that surrounds the outer periphery of the liquid crystal holder 27 on the first substrate 19 side, and the regions 57 and 55 of the second internal electrode 45 and the connecting region, which have substantially the same width, are connected at part of this outer periphery.

Figure 4A:
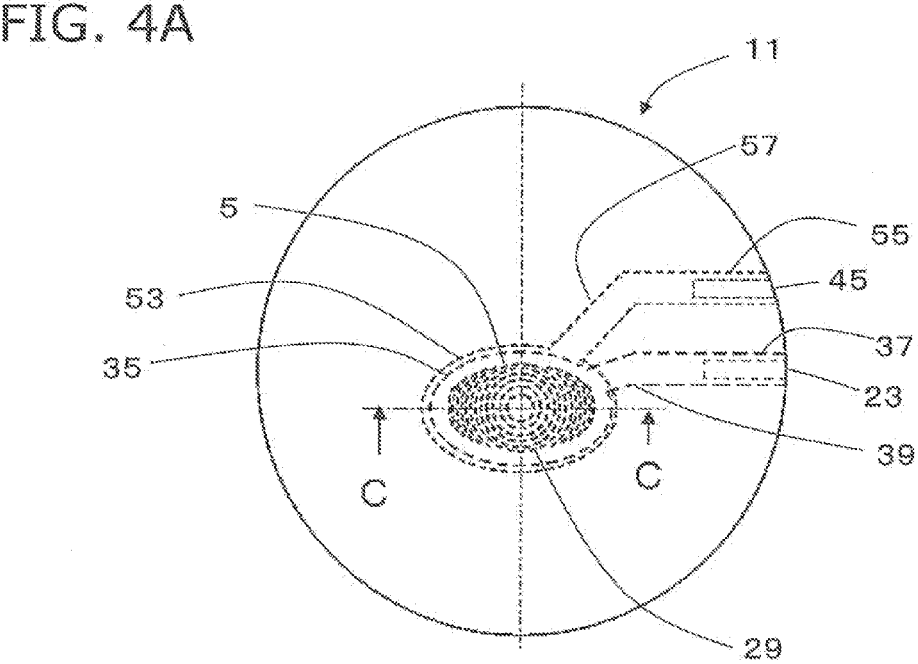
FIG. 4A is a front view of an upper substrate in the semi-finished blank for the varifocal lens pertaining to Embodiment 1 of the present invention.
Figure 4B:
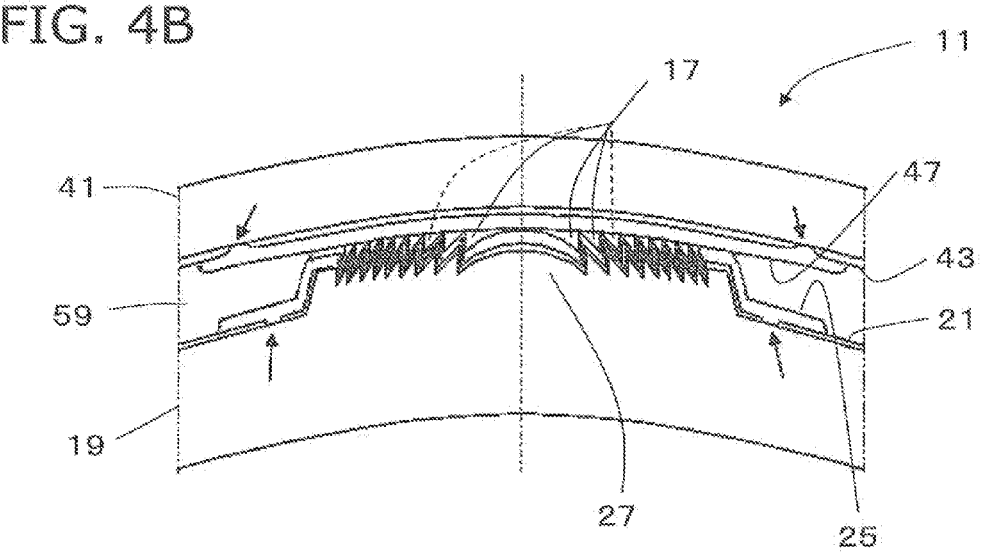
FIG. 4B is a cross section along the C-C line thereof.

The first substrate 19 and the second substrate 41 are discussed in detail below, but the convex curved face of the first substrate 19 is coated with the cholesteric liquid crystal material 17 and an adhesive agent 59 and joined to the concave curved face of the second substrate 41. FIGS. 4A and 4B show the state after this joining.

As shown in FIG. 4A, when the varifocal lens semi-finished blank 11 is viewed from the front, the region 35 (first applying region) of the first transparent conductive film 21 that covers the varifocal portion 5 is disposed so as to be included in the region 53 (second applying region) of the second transparent conductive film 43 that covers the varifocal portion 5.

The reason for this is that, in forming the region 35, since the first substrate 19 has the liquid crystal holder 27, laser irradiation can be carried out accurately by using the outer periphery of the liquid crystal holder 27 as a guide, whereas since there is no such guide on the second substrate 41 during the formation of the region 53, the region 53 is formed a bit larger so as not to be smaller than the varifocal portion 5. Therefore, to form the region 53, more precise machining is unnecessary, or there is no need to form a separate guide on the substrate. The arrows in FIG. 4B show the places where parts of the first and second transparent conductive films 21 and 43 have been removed by laser.

The region 31 excluding the region 35, and the region 49 excluding the region 53 are constituted so as not to be opposite each other in a state in which the first substrate 19 and the second substrate 41 have been joined. In other words, the region 37, which includes the connecting region 39 of the region 31 and the first transparent conductive film 21 that is opposite the first internal electrode 23, and the region 55, which includes the connecting region 57 of the region 49 and the second transparent conductive film 43 that is opposite the second internal electrode 45, are disposed at positions that are offset so as not to be opposite one another.

This reduces the power consumption of the varifocal eyeglasses 3. Specifically, in a state in which the first substrate 19 and the second substrate 41 are joined, the region 31 excluding the region 35, and the region 49 excluding the region 53 are disposed so as not to overlap in front view, which allows the overall electrostatic capacity to be smaller.

Figure 5:
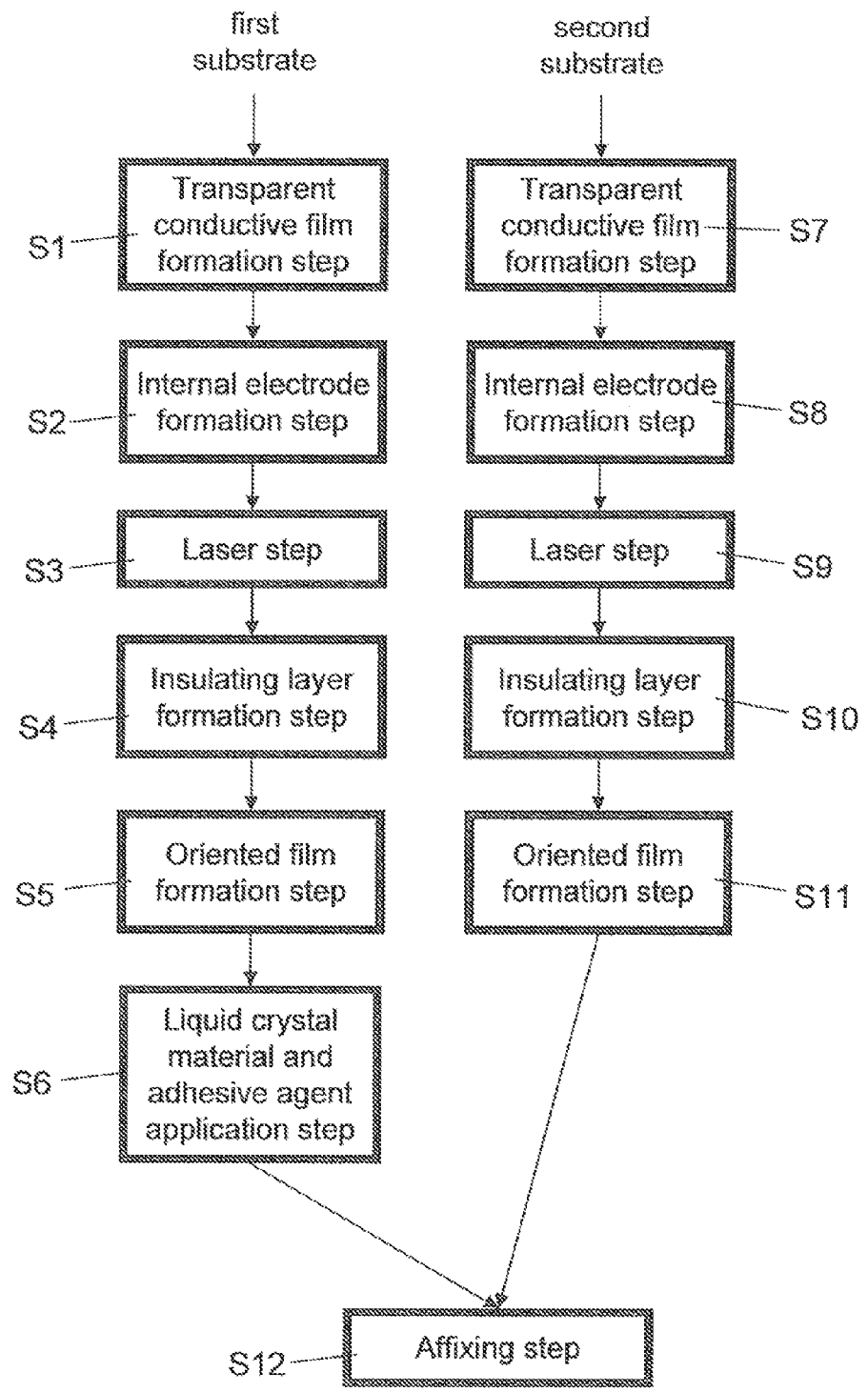
FIG. 5 is a flowchart of the manufacture of the varifocal lens pertaining to Embodiment 1 of the present invention.

Next, a method for manufacturing the varifocal lens semi-finished blank 11 will be described through reference to FIG. 5.

Steps 1 to 6 show the process of forming the first substrate 19, while steps 7 to 11 show the processing of forming thin films, etc., on the second substrate 41. Step 12 shows the process of affixing the first substrate 19 and the second substrate 41 together.

In step 1, the first transparent conductive film 21 is formed by sputtering on the convex curved face of the first substrate 19. The thickness of the first transparent conductive film 21 is preferably 10 to 30 nm.

In step 2, the first internal electrode 23 is formed. More specifically, a masking sheet patterned after the first internal electrode 23 is placed over the first substrate 19, and the first internal electrode 23 is formed by spin coating, after which the masking sheet is removed. The first internal electrode 23 here is formed so as to extend from a certain part of the interior of the first substrate 19 to the end (outer periphery). Consequently, a larger region can be used (is not wasted) in laser working. In this embodiment, the formation of the first internal electrode 23 was performed after the formation of the first transparent conductive film 21, but the order here may be reversed.

Step 3 is a step of performing laser patterning. A laser is directed at the first transparent conductive film 21 so as to surround the first internal electrode 23 and the outer periphery of the liquid crystal holder 27. This allows the region 31 to be electrically separated from the region 33 (everything else but the region 31). The laser working here is performed while using the outer periphery of the liquid crystal holder 27 as a guide and positioning with the edge of the varifocal lens semi-finished blank 11, but an inconspicuous bump, for example, may be formed at a suitable location of the first substrate 19 and used as a guide instead.

The laser is preferably one that can remove just the first transparent conductive film 21. Specifically, it is undesirable to use one that removes all the way down to the first substrate 19 provided under the first transparent conductive film 21, or one with inadequate electrical non-contact between the region 31 and the region 33 other than the region 31. In this embodiment, scribing was done with a YVO4 laser having a wavelength of 1064 nm, 18 w, and 60 kHz.

Step 4 is a step of forming a first insulating layer (not shown). The first insulating layer is formed by sputtering. The first insulating layer here is constituted by a silicon dioxide film.

After this, in step 5, the first oriented film 25 is formed on the surface of the liquid crystal holder 27 of the first substrate 19, and the film is subjected to orientation processing.

In step 6, the first oriented film 25 is coated with the cholesteric liquid crystal material 17, and the region of the first insulating layer not coated with the cholesteric liquid crystal material 17 is coated with the adhesive agent 59.

As to the step on the second substrate 41 side here, this is substantially the same as the step on the first substrate 19 side, excluding the step of coating with the cholesteric liquid crystal material 17 and the adhesive agent 59 (step 6). Accordingly, steps 7 to 11 will not be described here. That is, steps 1 to 5 correspond to steps 7 to 11, respectively.

No liquid crystal holder 27 is present on the second substrate 41, but the second oriented film 47 is formed in the region on the second substrate 41 side disposed opposite the liquid crystal holder 27, and subjected to orientation processing (step 11).

Finally, in step 12, after the thin films, etc., have been formed on the first substrate 19 and the second substrate 41, the first and second substrates 19 and 41 are placed in a sealed vessel (not shown) and joined under a reduced-pressure environment.

With the varifocal lens semi-finished blank 11 of this embodiment, as discussed above, the first transparent conductive film 21 is separated by laser into the region 31, which includes the region that is opposite the varifocal portion 5, and the region 33, which is everything else but the region 31, and the second transparent conductive film 43 is separated by laser into the region 49, which includes the region that is opposite the varifocal portion 5, and the region 51, which is everything else but the region 49.

Consequently, power consumption can be reduced without making the masking face stand out, which prevents a decrease in the commercial value of the varifocal lens 1. Specifically, the presence of the first and second transparent conductive films 21 and 43 has almost no effect on the refractive index or transmissivity, and the battery charge can be extended.

Also, the varifocal lens semi-finished blank 11 is disposed so that the region 31 and the region 49 overlap hardly at all in front view, except for at the varifocal portion 5. This further lowers the power consumption of the varifocal eyeglasses 3. Furthermore, the region 37 of the first internal electrode 23 and the region 55 of the second internal electrode 45 are disposed so as not to be opposite each other, and the connecting region 39 and the connecting region 57 are not opposite each other. Consequently, overlap of laser scribing is only at the two places where the connecting region 39 and the region 53 overlap. Also, since this portion is located to the outside of the varifocal portion 5, it is barely noticeable when the varifocal eyeglasses 3 are worn.

In this embodiment, the laser was directed at both the first transparent conductive film 21 and the second transparent conductive film 43, but may instead be directed at just one or the other. As a result, the process of manufacturing the varifocal lens semi-finished blank 11 can be simplified while maintaining the effect discussed above.

Also, the liquid crystal holder 27 may be formed in the concave curved face of the second substrate 41 instead of in the convex curved face of the first substrate 19.

Embodiment 2

Figure 6A:
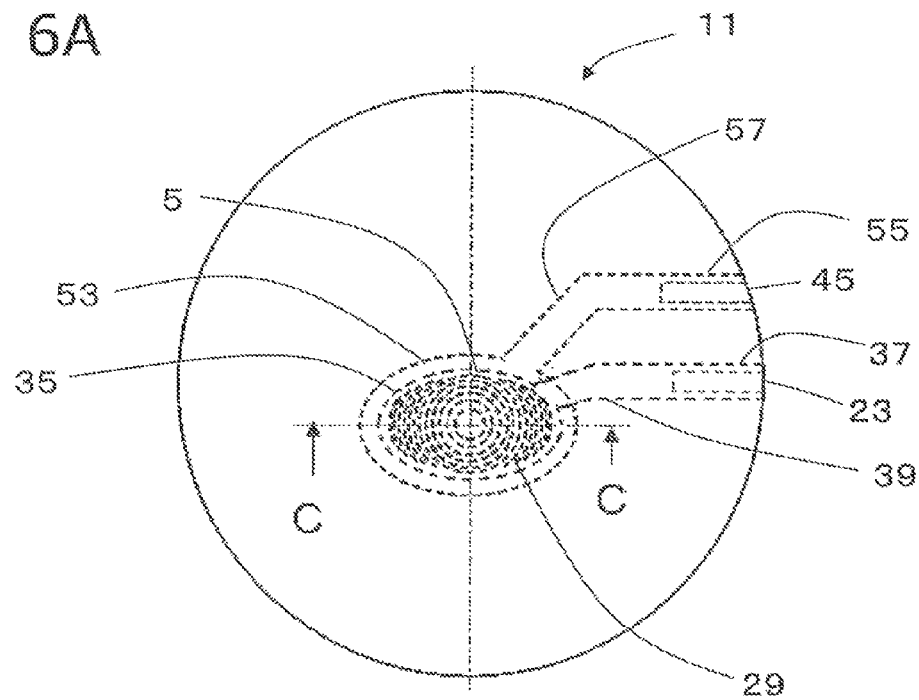
FIG. 6A is a front view of an upper substrate in the semi-finished blank for a varifocal lens pertaining to Embodiment 2 of the present invention.
Figure 6B:
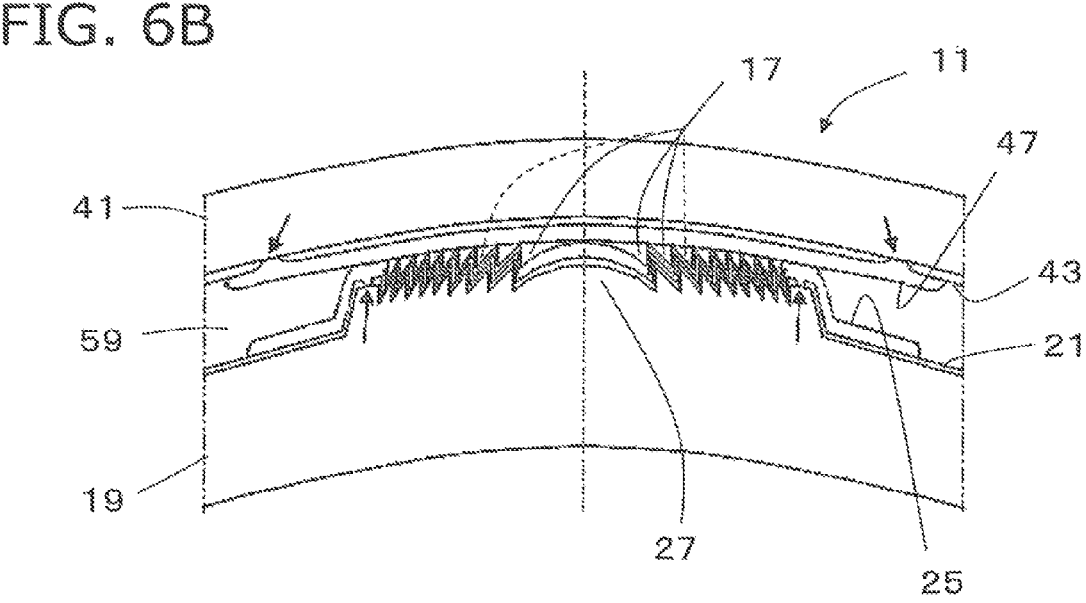
FIG. 6B is a cross section along the C-C line thereof.

FIG. 6 is a diagram illustrating a varifocal lens semi-finished blank pertaining to Embodiment 2 of the present invention. Those portions and members that are the same as in Embodiment 1 above will be numbered the same and not described again.

In Embodiment 1 above, in forming the region 31 with a laser, the outer periphery of the liquid crystal holder 27 was scribed with the laser. In this embodiment, by contrast, the region 31 is formed by directing the laser at the outer periphery of the Fresnel lens 29, which is the top face of the liquid crystal holder 27. The second substrate 41 can be constituted the same as in Embodiment 1 above, but the surface area of the region 35 of the region 49 can be smaller.

With this configuration, power consumption by the varifocal eyeglasses can be further reduced.

In both of Embodiments 1 and 2 above, an example was given in which a laser was used to separate partial regions of the first and second transparent conductive films 21 and 43, but the present invention is not limited to this.

For instance, photoetching or some other means may be used to separate a region of the first transparent conductive film into a first region and a second region, and similarly, the region of the second transparent conductive film may be separated into a third region and a fourth region.

INDUSTRIAL APPLICABILITY

The varifocal lens semi-finished blank pertaining to the present invention has the effect of reducing power consumption, and therefore can be widely applied to eyeglass lenses, cameras, and other such optical members.

REFERENCE SIGNS LIST 1 varifocal lens
3 varifocal eyeglasses
5 varifocal portion
7 eyeglass frame
9 circuit section
11 varifocal lens semi-finished blank
17 cholesteric liquid crystal material
19 first substrate
21 first transparent conductive film
23 first internal electrode
25 first oriented film
27 liquid crystal holder
29 Fresnel lens
31 region (first region)
33 region (second region)
35 region (first applying region)
37 region
39 connecting region
41 second substrate
43 second transparent conductive film
45 internal electrode (second internal electrode)
47 second oriented film
49 region (first region)
51 region (second region)
53 region (second applying region)

55 region
57 connecting region
59 adhesive agent

The invention claimed is:

1. A semi-finished blank for a varifocal lens, comprising:
a first substrate;
a first transparent conductive film formed on a front face of said first substrate;
a second substrate that is opposite to said first substrate;
a second transparent conductive film formed on a back face of said second substrate; and
a varifocal portion disposed between said front face of said first substrate and said back face of said second substrate;
wherein at least one of said first transparent conductive film and said second transparent conductive film comprises a first region of transparent conductive film that includes an area opposite to said varifocal portion and a second region of transparent conductive film that is electrically insulated from said first region of transparent conductive film, and
both the area of the first region of transparent conductive film opposite to said varifocal portion and the second region of transparent conductive film are a part of one of said first transparent conductive film and said second transparent conductive film.

2. The semi-finished blank for a varifocal lens according to claim 1, and further comprising:
a first internal electrode connected to said first transparent conductive film; and
a second internal electrode connected to said second transparent conductive film;
wherein said first region further includes a second area of said at least one of said first transparent conductive film and said second transparent conductive film that is opposite to at least one of said first internal electrode and said second internal electrode.

3. The semi-finished blank for a varifocal lens according to claim 2, wherein:
both of said first transparent conductive film and said second transparent conductive film comprises said first region and said second region;
said first region of said first transparent conductive film comprises said area opposite to said varifocal portion, said second area which is opposite to said first internal electrode and a connecting area that connects between said area opposite to said varifocal portion and said second area;
said first region of said second transparent conductive film comprises said area opposite to said varifocal portion, said second area which is opposite to said second internal electrode and a connecting area that connects between said area opposite to said varifocal portion and said second area; and
said connecting area of said first transparent conductive film and said connecting area of said second transparent conductive film are offset with respect to each other as seen in a direction perpendicular to said front face and said back face.

4. A varifocal lens formed using the semi-finished blank for a varifocal lens according to claim 3, comprising:
a first terminal that is connected to said first internal electrode, said first terminal being provided on a side face of said lens;
a second terminal that is connected to said second internal electrode and is provided on said side face of said lens.

5. Varifocal eyeglasses formed by using the varifocal lens according to claim 4, including a circuit section that applies voltage to said varifocal portion through said first terminal and said second terminal and controls the applied voltage.

6. Varifocal eyeglasses according to claim 5, wherein said first region and said second region are electrically insulated from each other by laser processing to form a laser trace separating said first region and said second region.

* * * * *